(12) United States Patent
Tempel

(10) Patent No.: US 12,582,021 B2
(45) Date of Patent: Mar. 24, 2026

(54) METHOD FOR PLANTATION TREATMENT OF A PLANTATION FIELD WITH A VARIABLE APPLICATION RATE

(71) Applicant: BASF Agro Trademarks GmbH, Ludwigshafen am Rein (DE)

(72) Inventor: Matthias Tempel, Leverkusen (DE)

(73) Assignee: BASF Agro Trademarks GmbH, Ludwigshafen am Rhein (DE)

( * ) Notice: Subject to any disclaimer, the term of this patent is extended or adjusted under 35 U.S.C. 154(b) by 1021 days.

(21) Appl. No.: 17/599,107

(22) PCT Filed: Mar. 27, 2020

(86) PCT No.: PCT/EP2020/058863
§ 371 (c)(1),
(2) Date: Sep. 28, 2021

(87) PCT Pub. No.: WO2020/201163
PCT Pub. Date: Oct. 8, 2020

(65) Prior Publication Data
US 2022/0167546 A1     Jun. 2, 2022

(30) Foreign Application Priority Data

Mar. 29, 2019     (EP) ..................................... 19166277

(51) Int. Cl.
*A01B 79/00*          (2006.01)
*A01B 79/02*          (2006.01)
(Continued)

(52) U.S. Cl.
CPC ............ *A01B 79/005* (2013.01); *A01B 79/02* (2013.01); *A01C 21/002* (2013.01);
(Continued)

(58) Field of Classification Search
CPC ..... A01B 79/005; A01B 79/02; A01C 21/002; A01C 21/007; G06T 7/60; G06T 7/70;
(Continued)

(56) References Cited

U.S. PATENT DOCUMENTS 5,278,423 A     1/1994 Wangler et al.
7,263,210 B2     8/2007 Kümmel
(Continued)

FOREIGN PATENT DOCUMENTS

DE       199 50 396 A1     5/2001
RU       2 231 259 C2     1/2014
WO       2018/123630 A1     7/2018

OTHER PUBLICATIONS

Qian, Fang (CN111124014A), pp. 1-11; May 8, 2020 (Year: 2020).*
International Search Report and Written Opinion for PCT/EP2020/058863 mailed May 19, 2020, 9 pages.

*Primary Examiner* — Michael J Dalbo
*Assistant Examiner* — Kaleria Knox
(74) *Attorney, Agent, or Firm* — ArentFox Schiff LLP

(57)     ABSTRACT

A method for plantation treatment of a plantation field, the method comprising: determining (S10) an application rate decision logic (10) based on offline field data (Doff) relating to expected conditions on the plantation field (300); taking (S20) an image (20) of a plantation of a plantation field (300); recognizing (S30) objects (30) on the taken image (20); determining (S40) an application rate based on the determined application rate decision logic (10) and the recognized objects (30); and determining (S50) a control signal (S) for controlling a treatment arrangement (50) of a treatment device (200) based on the determined application rate.

19 Claims, 3 Drawing Sheets

(51) Int. Cl.

| | |
|---|---|
| *A01C 21/00* | (2006.01) |
| *A01M 7/00* | (2006.01) |
| *G06T 7/60* | (2017.01) |
| *G06T 7/70* | (2017.01) |
| *G06V 10/70* | (2022.01) |
| *G06V 20/10* | (2022.01) |

(52) U.S. Cl.
CPC ......... *A01C 21/007* (2013.01); *A01M 7/0089* (2013.01); *G06T 7/60* (2013.01); *G06T 7/70* (2017.01); *G06V 10/70* (2022.01); *G06V 20/188* (2022.01); *G06T 2207/10024* (2013.01); *G06T 2207/10048* (2013.01); *G06T 2207/20081* (2013.01); *G06T 2207/30188* (2013.01)

(58) Field of Classification Search
CPC . G06T 2207/10024; G06T 2207/10048; G06T 2207/20081; G06T 2207/30188; G06V 10/70; G06V 20/188
See application file for complete search history.

(56) References Cited

U.S. PATENT DOCUMENTS

| | | | | |
|---|---|---|---|---|
| 9,339,023 | B2 | 5/2016 | Ballu | |
| 10,531,603 | B2 | 1/2020 | Ferrari et al. | |
| 10,568,316 | B2 | 2/2020 | Gall et al. | |
| 10,681,905 | B2 | 6/2020 | Tanner et al. | |
| 2015/0027040 | A1* | 1/2015 | Redden | A01M 21/043 |
| | | | | 47/1.3 |
| 2016/0019560 | A1* | 1/2016 | Benkert | G06Q 10/00 |
| | | | | 705/7.29 |
| 2016/0150744 | A1* | 6/2016 | Lin | A01M 7/0089 |
| | | | | 43/132.1 |
| 2017/0015416 | A1* | 1/2017 | O'Connor | A01M 7/0089 |
| 2017/0031344 | A1* | 2/2017 | Zimmerman | A01C 21/007 |
| 2017/0359943 | A1* | 12/2017 | Calleija | A01M 7/0089 |
| 2018/0108123 | A1* | 4/2018 | Baurer | A01G 2/00 |
| 2018/0168141 | A1* | 6/2018 | Tanner | A01M 7/00 |
| 2018/0348714 | A1* | 12/2018 | Larue | A01G 25/092 |
| 2019/0150357 | A1* | 5/2019 | Wu | H04N 7/188 |
| 2019/0176027 | A1* | 6/2019 | Smith | H04S 7/304 |
| 2019/0333214 | A1* | 10/2019 | Haneda | A01G 25/09 |
| 2020/0113122 | A1* | 4/2020 | Pomedli | A01B 79/005 |
| 2020/0253127 | A1* | 8/2020 | McCall | G06Q 50/02 |
| 2021/0133443 | A1* | 5/2021 | Gurzoni, Jr. | G06V 10/803 |

* cited by examiner

METHOD FOR PLANTATION TREATMENT OF A PLANTATION FIELD WITH A VARIABLE APPLICATION RATE

CROSS-REFERENCE TO RELATED APPLICATION(S)

This application is a national stage entry under 35 U.S.C. § 371 of International Application No. PCT/EP2020/058863, filed on Mar. 27, 2020, which claims the benefit of priority of European Patent Application No. 19166277.4, filed on Mar. 29, 2019, the disclosures of which are hereby incorporated by reference herein in their entireties.

FIELD OF INVENTION

The present invention relates to a method and a treatment device for plantation treatment of a plantation field, as well as a field manager system for such a treatment device and a treatment system.

BACKGROUND OF THE INVENTION

The general background of this invention is the treatment of plantation in an agricultural field. The treatment of plantation, in particular the actual crops, also comprises the treatment of weed in the agricultural field, the treatment of the insects in the agricultural field as well as the treatment of pathogens in the agricultural field.

Agricultural machines or automated treatment devices, like smart sprayers, treat the weed, the insects and/or the pathogens in the agricultural field based on ecological and economical rules. In order to automatically detect and identify the different objects to be treated image recognition is used.

Smart sprayers have camera sensors attached to detect green plants by differentiating biomass versus soil. This enables them to apply herbicides only where biomass, i.e. weeds, are being detected. To do this, the smart sprayer is shutting on and off single nozzles when it is moving across the field.

The biomass detection technology is able to provide the percentage of biomass coverage in the pass of each nozzle, e.g. out of 1 m² measured in front of a nozzle 2% is covered by biomass. In addition it is also able to provide geometrical information about each individual detected object, e.g. size, shape or pattern, that sums up the total percentage value.

Turning on and off the nozzles of the smart sprayer only where an application is required allows for significant savings of crop protection products. In order to achieve a high weed control efficacy the application rate of the herbicide or tank mix of herbicides must be high enough to be able to control the most difficult to control weed that is present on a field. Per weed species, weed growth stage, weed density and also different environment conditions a different application rate is needed to reach the agronomic sustainable target efficacy.

Current sprayers work with a single application rate that has been pre-defined when the tank mix of water and herbicides was created.

SUMMARY OF THE INVENTION

It would be advantageous to have an improved method for plantation treatment of a plantation field with a variable application rate.

The object of the present invention is solved with the subject matter of the independent claims, wherein further embodiments are incorporated in the dependent claims. It should be noted that the following described aspects and examples of the invention apply also for the method, the treatment device and the field manager system.

According to a first aspect a method for plantation treatment of a plantation field comprises:

receiving an application rate decision logic based on offline field data relating to expected conditions on the plantation field;

taking an image of a plantation of a plantation field;

recognizing objects on the taken image;

determining an application rate based on the determined application rate decision logic and the recognized objects;

determining a control signal for controlling a treatment arrangement of a treatment device based on the determined application rate;

The plantation treatment, as used herein, preferably comprises protecting a crop, which is the cultivated plantation on the plantation field, destroying a weed that is not cultivated and may be harmful for the crop, in particular with a herbicide, killing insects on the crop and/or the weed, in particular with an insecticide, and destroying any pathogen on the crop and/or the weed like a disease, in particular with a fungicide, and regulating the growth of plants, in particular with a plant growth regulator. The term "insecticide", as used herein, also encompasses nematicides, acaricides, and molluscicides. Furthermore, a safener may be used in combination with a herbicide.

In one embodiment taking an image includes taking an image in real time associated with a specific location on the plantation field to be treated or on the spot. This way the treatment can be finely adjusted to different situations on the field in quasi real time while the treatment is conducted. Additionally, treatment can be applied in a very targeted manner leading to more efficient and sustainable farming. In a preferred embodiment the treatment device comprises multiple image capture devices which are configured to take images of the plantation field as the treatment device traverses through the plantation field. Each image captured in such a way may be associated with a location and as such provide a snapshot of the real time situation in the location of the plantation field to be treated. In order to enable a real time, location specific control of the treatment device, the parametrization received prior to treatment provides a way to accelerate situation specific control of the treatment device. Thus, decisions can be made on the fly while the treatment device traverses through the field and captures location specific images of the field locations to be treated.

Preferably the steps of taking an image, determining a control signal and optionally providing the control signal to a control unit to initiate treatment are executed in real time during passage of the treatment device through the field or during field treatment. Optionally the control signal may be provided to a control unit of the treatment device to initiate treatment of the plantation field.

In one embodiment offline data including expected environmental data, such as expected soils data, a timing prediction on when to spray based on expected weather data and/or specification on agricultural measures, e.g. the tillage system used, expected weed spectrum and expected weed growth stages are received. Determining applications rates may further be based on offline data including expected environmental data, expected weed spectrum and expected weed growth stages.

The term "object", as used herein, comprises plantation, like weed or crops, insects and/or pathogens. The object may relate to an object to be treated by the treatment device, such as a plantation, like weed or crops, insects and/or pathogens. The object may be treated with a treatment product such as a crop protection product. The object may be associated with a location in the field to allow for location specific treatment.

Preferably, the control signal for controlling the treatment device may be determined based on the determined application rate decision logic, the recognized objects and online field data. In one embodiment online field data is collected in real time in particular by the plantation treatment device. Collecting online field data may include collecting sensor data from sensors attached to the treatment device or placed in the plantation field in particular on the fly or in real time as the treatment device passages the field. Collecting online field data may include a growth stage of the weed in relation to surrounding crops, seed multiplication, soil data collected via soil sensory in the field associated with properties of the soil such as a current soil condition, e.g. nutrient content or soil moisture, and/or soil composition, or weather data collected via weather sensory placed in or in proximity to the field or attached to the treatment device and associated with a current weather condition or data collected via both soil and weather sensory.

Seed multiplication relates to an indication of locations, where a weed has reached seed maturity in the past, wherein it is assumed that at that location a higher density of weed is expected due to remaining seeds of the weed in the ground. In addition, it is assumed that due to work on the plantation field, the weed seed might have spread out. This information can be collected in a ground weed seed database. Consequently, the application rate decision logic increases the application rate whenever seed multiplication is determined at a certain location.

The term "offline field data" as used herein refers to any data generated, collected, processed before determination of the application rate decision logic. Preferably, the offline field data is determined externally from the plantation treatment device, or before the treatment device is being used. Offline field data for instance includes weather data associated with expected weather conditions at the time of treatment, expected soil data associated with expected soil conditions, e.g. nutrient content or soil moisture, and/or soil composition, at the time of treatment, growth stage data associated with the growth stage of e.g. a weed or crop at the time of treatment, disease data associated with the disease stage of a crop at the time of treatment, a resistance level of the weed and/or a yield impact of the weed on the crop.

The term "spatially resolved" as used herein refers to any information on a sub-field scale. Such resolution may be associated with more than one location coordinate on the plantation field or with a spatial grid of the plantation field having grid elements on a sub-field scale. In particular, the information on the plantation field may be associated with more than one location or grid element on the plantation field. Such spatial resolution on sub-field scale allows for more tailored and targeted treatment of the plantation field.

The term "condition on the plantation field" relates to any condition of the plantation field or environmental condition in the plantation field, which has impact on the treatment of the plantation. Such condition may be associated with the soil or weather condition. The soil condition may be specified by soil data relating to a current or expected condition of the soil. The weather condition may be associated with weather data relating to a current or expected condition of the weather. The growth condition may be associated with the growth stage of e.g. a crop or weed. The disease condition may be associated with the disease data relating to a current or expected condition of the disease.

The term "treatment device", as used herein or also called control technology, preferably comprises chemical control technology. Chemical control technology preferably comprises at least one means for application of treatment products, particularly crop protection products like insecticides and/or herbicides and/or plant growth regulators and/or fungicides. Such means may include a treatment arrangement of one or more spray guns or spray nozzles arranged on an agricultural machine, drone or robot for maneuvering through the plantation field. In a preferred embodiment the treatment device comprises one or more spray gun(s) and associated image capture device(s). The image capture devices may be arranged such that the images are associated with the area to be treated by the one or more spray gun(s). The image capture devices may for instance be mounted such that an image in direction of travel of the treatment device is taken covering an area that is to be treated by the respective spray gun(s). Each image may be associated with a location and as such provide a snapshot of the real time situation in the plantation field prior to treatment. Hence the image capture devices may take images of specific locations of the plantation field as the treatment device traverses through the field and the control signal may be adapted accordingly based on the image taken of the area to be treated. The control signal may hence be adapted to the situation captured by the image at the time of treatment in a specific location of the field.

The term "recognizing", as used herein, comprises the state of detecting an object, in other words knowing that at a certain location is an object but not what the object exactly is, and the state of identifying an object, in other words knowing the type of object that has been detected, in particular the species of plantation, like crop or weed, insect and/or pathogen. In particular, the recognition may be based on an image recognition and classification algorithm, such as a convolutional neural network or others known in the art. In particular, the recognition of an object is location specific depending on the location of the treatment device. This way treatment can be adapted to a local situation in the field in real-time.

The term "application rate decision logic", as used herein, relates to a set of parameters provided to a treatment device for controlling the treatment device treating the plantation. In one embodiment the application rate decision logic provides a logic to decrease or increase application rates depending on the expected efficacy loss. The application rate decision logic preferably relates to a configuration file for the treatment device. In other words, the application rate decision logic may be a decision tree with one or more layers, which is used to determine a control signal for controlling the treatment device dependent on measurable input variables e.g. images taken and/or online field data. The application rate decision logic may include one layer relating to an on/off decision and optionally a second layer relating to a composition of a treatment product expected to be used and further optionally a third layer relating to a application rate of the treatment product expected to be used. In such way a situational, real-time decision on treatment is based on real-time images and/or online field data collected while the treatment device passages the field. Providing a application rate decision logic prior to the execution of treatment reduces the computing time and at the same time enables reliable determination of control signals for treatment. The application rate decision logic or configuration file may include location specific parameters provided to the treatment device, which may be used to determine the control signal.

In one layer the application rate decision logic may include thresholds relating to a parameter derived from the taken image and/or the object recognition. Such parameters may relate to a parameter derived from the image that is associated with the object(s) recognized and decisive for the treatment decision. Further parameters may be derived from online field data. Is the derived parameter e.g. below the threshold the decision is off or no treatment decisive for the treatment decision. Is the derived parameter e.g. above the threshold the decision is on or treatment. In such way the control signal is determined based on the application rate decision logic and the recognized objects. In the case of weed the derived parameter from the image and/or recognized weeds in the image may be based on a parameter signifying the weed coverage. Similarly in the case of a pathogen the derived parameter from the image and/or recognized pathogens in the image may be based on a parameter signifying the pathogen infestation. Further similarly in the case of a insects the derived parameter from the image and/or recognized insects in the image may be based on a parameter signifying the number of insects present in the image.

Preferably, the treatment device is provided with an application rate decision logic or configuration file, based on which the treatment device controls the treatment arrangement. In a further embodiment determination of the configuration file comprises a determination of an application rate level the treatment product is to be applied. The application rate decision logic may include a layer on application rate of the treatment product relating to a derived parameter from the image and/or object recognition. Further parameters may be derived from online field data. In other words, based on the configuration file the treatment device is controlled, as to which application rate of the treatment product should be applied based on real-time parameters of the plantation field, such as images taken and/or online field data. In a preferred embodiment the application rate decision logic includes variable or incremental application rates depending on one or more parameter(s) derived from the image and/or object recognition. In a further preferred embodiment determining an application rate based on the recognized objects includes determining object species, object growth stages and/or object density. Here object density refers to the density of objects identified in a certain area. Object species, object growth stages and/or object density may be the parameters derived from the image and/or object recognition according to which the variable or incremental application rate is determined. With the enhance object recognition based on geometric object profiles, application rates can be adjusted more robustly without efficacy loss, since object species, object growth stages, object density and/or different environmental conditions can be included in determination of the application rate.

The application rate decision logic may include a further layer on the composition of the treatment product expected to be used. In such a case the application rate decision logic may be determined depending on an expected significant yield or quality impact on the crop, an ecological impact and/or costs of the treatment product composition. Therefore, based on the application rate decision logic, the decision, if a field is treated or not and with which treatment product composition at which application rate level it should be treated is taken for the best possible result in regard of efficiency and/or efficacy. The application rate decision logic may include a tank recipe for a treatment product tank system of the treatment device. In other words, the treatment product composition may signify the treatment product components provided in one or more tank(s) of the treatment device prior to conducting the treatment. Mixtures from one or more tank(s) forming the treatment product may be controlled on the fly depending on the determined composition of the treatment product. The treatment product preferably comprises at least one active ingredient, a thinner for diluting the active ingredient, for example water, a safener for increasing a tolerance of the crop against the treatment product, an adjuvant for improved mixing and handling properties of the treatment product, a micro nutrient, and/or a liquid fertilizer like urea ammonium nitrate, UAN, for increasing an effectiveness of the treatment product.

The term "application rate", as used herein, describes an amount of treatment product per area, for example one liter of treatment product per hectare. Additionally, an amount of active ingredient per area is described by the term "dose rate", for example 0.1 liter of active ingredient per hectare. Consequently, determining the application rate preferably comprises determining the dose rate. In other words, by changing the composition of the treatment product, the dose rate can be adjusted without changing the overall application rate.

The term "efficiency" relates to balance of the amount of treatment product applied and the amount of treatment product needed to effectively treat the plantation in the plantation field. How efficiently a treatment is conducted depends on environmental factors such as weather and soil.

The term "efficacy" relates to the balance of positive and negative effects of a treatment product. In other words, efficacy relates to the optimum of the application rate of treatment product needed to effectively treat a specific plantation. The application rate should not be so high that treatment product is wasted, which would also increase the costs and the negative impact on the environment, but is not so low that the treatment product is not effectively treated, which could lead to immunization of the plantation against the treatment product. Efficacy of a treatment product also depends on environmental factors such as weather and soil.

The term "treatment product", as used herein, refers to products for plantation treatment such as herbicides, insecticides, fungicides, plant growth regulators, nutrition products and/or mixtures thereof. The treatment product may comprise different components—including different active ingredients—such as different herbicides, different fungicides, different insecticide, different nutrition products, different nutrients, as well as further components such as safeners (particularly used in combination with herbicides), adjuvants, fertilizers, co-formulants, stabilizers and/or mixtures thereof. The term "treatment product composition" is a composition comprising one, or two, or more treatment products. Thus, there are different types of e.g. herbicides, insecticides and/or fungicides, respectively based on different active ingredient(s). Since the plantation to be protected by the treatment product preferably is a crop, the treatment product can be referred to as crop protection product. The treatment product composition may also comprise additional substances that are mixed to the treatment product, like for example water, in particular for diluting and/or thinning the treatment product, and/or a nutrient solution, in particular for enhancing the efficacy of the treatment product. Preferably, the nutrient solution is a nitrogen-containing solution, for example liquid urea ammonium nitrate (UAN).

The term "nutrition product", as used herein, refers to any products which are beneficial for the plant nutrition and/or plant health, including but not limited to fertilizers, macronutrients and micronutrients.

The application rate decision logic preferably is used to increase or decrease the application rate depending on an expected efficacy loss for the treatment product that is being used for plantation treatment.

Lowering the treatment product application rate, also called application rate, is increasing the efficacy but also the increases the risk of resistance if the treatment product application rate is not sufficient. Therefore, the application rate decision logic and/or the decision factors are validated and adjusted accordingly.

Being able to use variable application rates allows for a much higher differentiation of application rates considering object species, object growth stages, object density and/or different environmental conditions. The application rate can be variably adjusted to reach the target efficacy, for example, in increments in a range of 1% to 20%, more preferably in increments in a range of 2% to 15%, most preferably in increments in a range of 5% to 10%, further preferably in increments of 10%. However, every resolution of application rate is possible. Therefore, the efficiency of a treatment product application is significantly increased, reaching the same target efficacy with less treatment product used. More preferably, the application rate shall not exceed a upper threshold, wherein this upper threshold is determined by the maximum dose rate, which is legally admissible according to the applicable regulatory laws and regulations, in relation to the corresponding active ingredients of the treatment product. Thus, preferably, the application rate decision logic does not increase the application rate if that would exceed this upper threshold.

Preferably, the treatment device is provided with a configuration file, based on which the treatment device controls the treatment arrangement. The application rate of the treatment arrangement is controlled based on the configuration file.

Preferably, a tank recipe is provided to the treatment device based on regional knowledge and/or field specific information, in particular from previous scouting, and/or management information, preferably comprising soil information and/or tillage information and/or seeding information and/or weather information.

Thus, an improved method for plantation treatment of a plantation with a variable application rate is provided.

In a preferred embodiment, taking an image of a plantation of a plantation field, recognizing objects on the taken image, determining an application rate and determining a control signal for controlling a treatment arrangement are carried out as real time process, such that the treatment device is instantaneous controllable based on taken images of the plantation field as the treatment device traverses through the field at the time of treatment in a specific location of the field.

Thus, an improved method for plantation treatment of a plantation with a variable application rate is provided.

In a preferred embodiment, the application rate decision logic provides a logic to determine the application rate for treating the plantation depending on an expected efficacy loss of a crop to be cultivated in the plantation field.

Thus, an improved method for plantation treatment of a plantation with a variable application rate is provided.

In a preferred embodiment, the application rate decision logic includes variable application rates depending on one or more parameter(s) derived from the image and/or object recognition.

Preferably, the offline field data comprises local yield expectation data, resistance data relating to a likelihood of resistance of the plantation against a treatment product, expected weather data, expected plantation growth data, zone information data, relating to different zones of the plantation field e.g. as determined based on biomass, expected soil data and/or legal restriction data.

In a further embodiment, the expected weather data refers to data that reflects forecasted weather conditions. Based on such data the determination of the parametrization or a configuration file for the treatment arrangement for application is enhanced, since the efficacy impact on treatment products may be included into the activation decision and application rate. For instance, if a weather with high humidity is present, the decision may be taken to apply a treatment product since it is very effective in such conditions. The expected weather data may be spatially resolved to provide weather conditions in different zones or at different locations in the plantation field, where a treatment decision is to be made.

In a further embodiment, the expected weather data includes various parameters such as temperature, UV intensity, humidity, rain forecast, evaporation, dew. Based on such data the determination of the parametrization or a configuration file for the treatment arrangement for application is enhanced, since the efficacy impact on treatment products may be included into the activation decision and application rate. For instance, if high temperatures and high UV intensity are present, the application rate of the treatment product may be increased to compensate for faster evaporation. On the other hand, if e.g. temperatures and UV intensity are moderate metabolism of plants is more active and the application rate of the treatment product may be decreased.

In a further embodiment, the expected soil data, e.g. soil moisture data, may be accessed from an external repository. Based on such data the determination of the parametrization or a configuration file for the treatment arrangement for application is enhanced, since the efficacy impact on treatment products may be included into the activation decision and application rate. For instance, if high soil moisture is present, the decision may be taken not to apply a treatment product due to sweeping effects. The expected soil data may be spatially resolved to provide soil moisture properties in different zones or at different locations in the plantation field, where a treatment decision is to be made.

In a further embodiment, at least part of the offline field data includes historic yield maps, historic satellite images and/or spatial distinctive crop growth models. In one example a performance map may be generated based on historic satellite image including e.g. images of the field at different points in a season for multiple seasons. Such performance maps allow to identify e.g. variations in fertility in the field by mapping zones which were more or less fertile over multiple seasons.

Preferably, at least part of the offline field data is determined by historic yield maps, Zoner Power Zones and/or spatial distinctive crop growth models.

Preferably, the expected plantation growth data is determined dependent on the amount of water still available in the soil of the plantation field and/or expected weather data.

Thus, an improved method for plantation treatment of a plantation with a variable application rate is provided.

In a preferred embodiment, the method comprises:

recognizing objects based on geometric object profiles, modeling the geometry of plants, e.g. weeds, based on their species and/or their growth stage.

The term "geometric object profile", as used herein, relates to profiles of objects describing geometric characteristics, like the shape of a plantation, insect and/or pathogen at a specific growth stage of the plantation, insect and/or pathogen.

If it is not possible to recognize objects and/or their growth stage only based on the taken image, geometric object profiles are preferably used to approximate different object species and object growth stages relevant for recognizing the object.

Determining the application rate is then based on the determined application rate decision logic and the objects recognized via approximation using geometric object profiles.

Thus, the online or real-time recognition of objects and/or their growth stage on the taken image can be improved.

In a preferred embodiment, the method comprises:

determining an application rate based on the recognized objects includes determining object species, object growth stages and/or object density.

Preferably, recognizing objects includes recognizing a plantation, preferably a type of plantation and/or a plantation size, an insect, preferably a type of insect and/or an insect size, and/or a pathogen, preferably a type of pathogen and/or a pathogen size.

Thus, an improved method for plantation treatment of a plantation with a variable application rate is provided.

In a preferred embodiment, the method comprises:

determining online field data by the treatment device relating to current conditions on the plantation field; and determining the control signal dependent on the determined application rate decision logic and the determined recognized objects and/or the determined online field data.

Thus, an improved method for plantation treatment of a plantation with a variable application rate is provided.

Determining online field data by the treatment device may include sensory mounted on the treatment device or placed in the field and received by the treatment device.

In a preferred embodiment, the method comprises:

the online field data relates to current weather data, current plantation growth data and/or current soil data, e.g soil moisture data.

In one embodiment, the current weather data is recorded on the fly or on the spot. Such current weather data may be generated by different types of weather sensors mounted on the treatment device or one or more weather station(s) placed in or near the field. Hence the current weather data may be measured during movement of the treatment device on the plantation field. Current weather data refers to data that reflects the weather conditions at the location in the plantation field a treatment decision is to be made. Weather sensors are for instance rain, UV or wind sensors.

In a further embodiment, the current weather data includes various parameters such as temperature, UV intensity, humidity, rain forecast, evaporation, dew. Based on such data the determination of a configuration of the treatment device for application is enhanced, since the efficacy impact on treatment products may be included into the activation decision and application rate. For instance if high temperatures and high UV intensity are present, the application rate of the treatment product may be increased to compensate for faster evaporation.

In a further embodiment, the online field data includes current soil data. Such data may be provided through soil sensors placed in the field or it may be accessed form e.g. a repository. In the latter case current soil data may be downloaded onto a storage medium of an agricultural machine including treatment gun(s). Based on such data the determination of a configuration of the treatment arrangement for application is enhanced, since the efficacy impact on treatment products may be included into the activation decision and application rate. For instance, if high soil moisture is present, the decision may be taken not to apply a treatment product due to sweeping effects.

In a further embodiment, the weather data, current or expected, and/or the soil moisture data, current or expected, may be provided to a growth stage model to further determine the growth stage of a plantation, a weed or a crop plant. Additionally, or alternatively the weather data and the soil data may be provided to a disease model. Based on such data the determination of a configuration of the treatment device, in particular parts of the treatment arrangement like single nozzles, for application is enhanced, since the efficacy impact on the treatment product as e.g. the weeds and crops will grow with different speed during the time and after application may be included into the activation decision and application rate. Thus e.g. the size of the weed or the infection phase of the pathogen (either seen or derived from infection event in our models) at the moment of application may be included into the activation decision and application rate.

Thus, an improved method for plantation treatment of a plantation with a variable application rate is provided.

In a preferred embodiment, the method comprises the steps:

Determining and/or providing validation data dependent on a performance review of the treatment of the plantation; and adjusting the application rate decision logic dependent on the validation data.

Preferably, the performance review comprises a manual control of the application rate decision logic and/or an automated control of the application rate decision logic. For example, the manual control relates to a farmer observing the plantation field and answering a questionnaire. In a further example, the performance review is executed by taking images of a part of the plantation field that already has been treated and analyzing the taken images. In other words, the performance review evaluates the efficiency of the treatment and/or the efficacy of the treatment product after a plantation has been treated. For example, if a weed that has been treated is still present although it has been treated, the performance review will include information stating that the application rate decision logic used for this treatment did not achieve the goal of killing the weed.

Thus, an improved method for plantation treatment of a plantation with a variable application rate is provided.

In a preferred embodiment, the method comprises:

adjusting the application rate decision logic using a machine learning algorithm.

The machine learning algorithm may comprise decision trees, naive bayes classifications, nearest neighbors, neural networks, convolutional or recurrent neural networks, generative adversarial networks, support vector machines, linear regression, logistic regression, random forest and/or gradient boosting algorithms. Preferably the result of a machine learning algorithm is used to adjust the application rate decision logic.

Preferably the machine learning algorithm is organized to process an input having a high dimensionality into an output of a much lower dimensionality. Such a machine learning algorithm is termed "intelligent" because it is capable of being "trained." The algorithm may be trained using records of training data. A record of training data comprises training input data and corresponding training output data. The training output data of a record of training data is the result that is expected to be produced by the machine learning algorithm when being given the training input data of the same record of training data as input. The deviation between this expected result and the actual result produced by the algorithm is observed and rated by means of a "loss function". This loss function is used as a feedback for adjusting the parameters of the internal processing chain of the machine learning algorithm. For example, the parameters may be adjusted with the optimization goal of minimizing the values of the loss function that result when all training input data is fed into the machine learning algorithm and the outcome is compared with the corresponding training output data. The result of this training is that given a relatively small number of records of training data as "ground truth", the machine learning algorithm is enabled to perform its job well for a number of records of input data that higher by many orders of magnitude.

Thus, an improved method for plantation treatment of a plantation with a variable application rate is provided.

According to a further aspect a field manager system for a treatment device for plantation treatment of a plantation field comprises an offline field data interface being adapted for receiving offline field data relating to expected conditions on the plantation field, a machine learning unit being adapted for determining the application rate decision logic of the treatment device dependent on the offline field data and a decision logic interface, being adapted for providing the application rate decision logic to a treatment device, as described herein.

In a preferred embodiment, the field manager system comprises a validation data interface being adapted for receiving validation data, wherein the machine learning unit is adapted for adjusting the application rate decision logic dependent on the validation data.

According to a further aspect a treatment device for plantation treatment of a plantation field comprises an image capture device being adapted for taking an image of a plantation, a decision logic interface being adapted for receiving an application rate decision logic from a field manager system, as described herein, a treatment arrangement being adapted for treating the plantation dependent on the received application rate decision logic, an image recognition unit being adapted for recognizing objects on the taken image, a treatment control unit being adapted for determining a control signal for controlling a treatment arrangement dependent on the received application rate decision logic and the recognized objects, wherein the decision logic interface of the treatment device is connectable to a decision logic interface of a field manager system, as described herein, wherein the treatment device is adapted to activate the treatment arrangement based on the control signal of the treatment control unit.

Therefore, a much higher differentiation of application rates considering weed species, weed growth stages, weed density and/or different environmental conditions is allowed. The application rate can be variably adjusted to reach the target efficacy, for example in increments in a range of 1% to 20%, more preferably in increments in a range of 2% to 15%, most preferably in increments in a range of 5% to 10%, further preferably in increments of 10%. However, every resolution of application rate is possible. Therefore, the efficiency of a herbicide application is significantly increased, reaching the same target efficacy with less herbicides used.

In a preferred embodiment, the treatment device comprises an online field data interface being adapted for receiving online field data relating to current conditions on the plantation field, wherein the treatment control unit is adapted for determining a control signal for controlling a treatment arrangement dependent on the received application rate decision logic and the recognized objects and/or the online field data.

According to a further aspect a treatment device, as described herein, further comprises a controlling device, as described herein.

In a preferred embodiment the treatment device is designed as a smart sprayer, wherein the treatment arrangement is a nozzle arrangement.

The nozzle arrangement preferably comprises several independent nozzles, which may be controlled independently. Therefore, a much higher differentiation of application rates considering weed species, weed growth stages, weed density and/or different environmental conditions at each nozzle is allowed. The application rate at each nozzle can be variably adjusted to reach the target efficacy, for example in increments in a range of 1% to 20%, more preferably in increments in a range of 2% to 15%, most preferably in increments in a range of 5% to 10%, further preferably in increments of 10%. However, every resolution of application rate is possible. Therefore, the efficiency of a herbicide application is significantly increased, reaching the same target efficacy with less herbicides used.

According to a further aspect, a treatment system comprises a field manager system, as described herein, and a treatment device, as described herein.

Advantageously, the benefits provided by any of the above aspects equally apply to all of the other aspects and vice versa. The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF EMBODIMENTS

Figure 1:
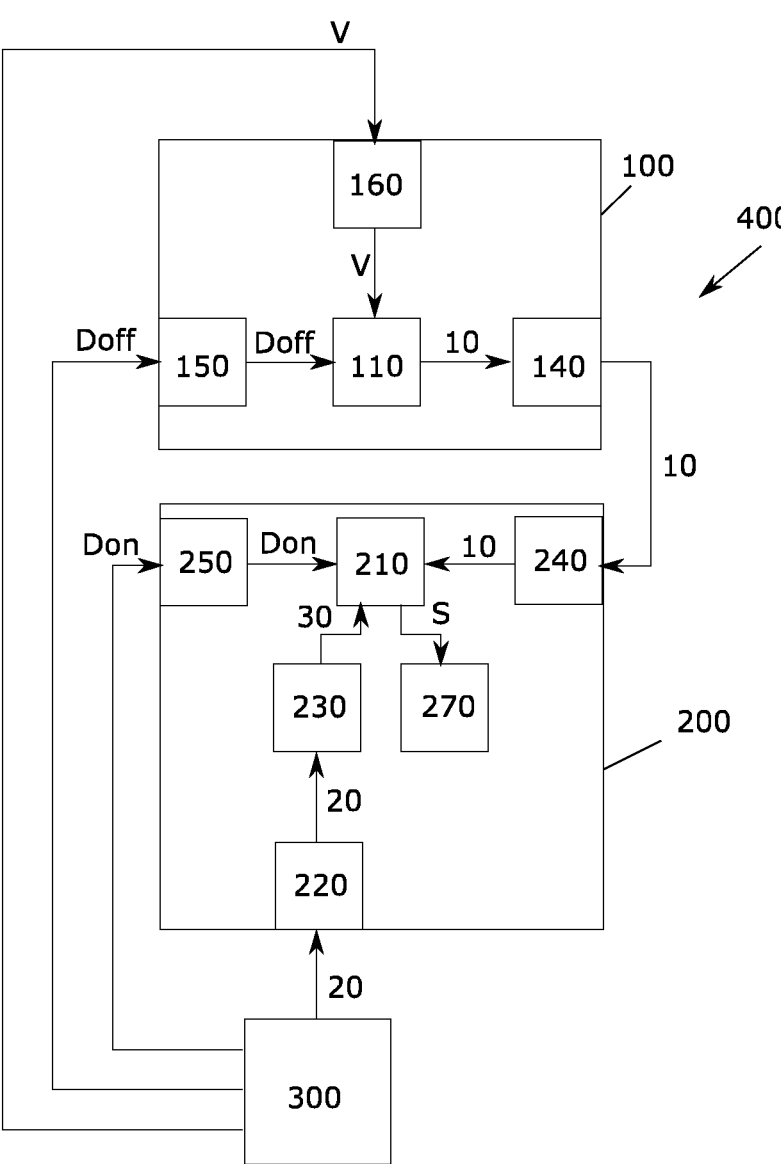
FIG. 1 shows a schematic diagram of a plantation treatment arrangement.

FIG. 1 shows a plantation treatment system 400 for treating a plantation of a plantation field 300 by at least one treatment device 200 controlled by a field manager system 100.

The treatment device 200, preferably a smart sprayer, comprises a treatment control unit 210, an image capture device 220, an image recognition unit 230 and a treatment arrangement 270 as well as a application rate decision logic interface 240 and an online field data interface 250.

The image capture device 220 comprises at least one camera, configured to take an image 20 of a plantation field 300. The taken image 20 is provided to the image recognition unit 230 of the treatment device 200.

The field manager system 100 comprises a machine learning unit 110. Additionally, the field manager system 100 comprises an offline field data interface 150, a application rate decision logic interface 140 and a validation data interface 160. The field manager system 100 may refer to a data processing element such as a microprocessor, microcontroller, field programmable gate array (FPGA), central processing unit (CPU), digital signal processor (DSP) capable of receiving field data, e.g. via a universal service bus (USB), a physical cable, Bluetooth, or another form of data connection. The field manager system 100 may be provided for each treatment device 200. Alternatively, the field manager system may be a central field manager system, e.g. a personal computer (PC), for controlling multiple treatment devices 200 in the field 300.

The field manager system 100 is provided with offline field data Doff relating to expected condition data of the plantation field 300. Preferably, the offline field data Doff comprises local yield expectation data, resistance data relating to a likelihood of resistance of the plantation against a treatment product, expected weather condition data, expected plantation growth data, zone information data, relating to different zones of the plantation field, expected soil moisture data and/or legal restriction data.

The offline field data Doff is provided from external repositories. For example, the expected weather condition data is provided by a weather station, providing a weather forecast. The weather station can also be a local weather station disposed on the plantation field or on the treatment device. Alternatively, the expected weather condition data can be provided by a service provider, which preferably uses satellite data for forecasting the weather. Additionally, the expected plantation growth data is for example provided by a database having stored different plantation growth stages or from plantation growth stage models, which make statements on the expected growth stage of a crop plant, a weed and/or a pathogen dependent on past field condition data. The expected plantation growth data alternatively is provided by plantation models, which are basically digital twins of the respective plantation, and estimate the growth stage of the plantation, in particular dependent on former field data. Further, for example the expected soil moisture data is determined dependent on the past, present and expected weather condition data. The offline field data Doff may also be provided by an external service provider.

Dependent on the offline field data Doff, the machine learning unit 110 determines a application rate decision logic 10. Preferably, the machine learning unit 110 knows the planned time of treatment of the plantation. For example, a farmer provides the field manager system 100 with the information that he plans to treat the plantation in a certain field the next day. The application rate decision logic 10 preferably is represented as a configuration file that is provided to the application rate decision logic interface 140 of the field manager system 100. Ideally, the application rate decision logic 10 is determined by the machine learning unit 110 on the same day, the treatment device 200 is using the application rate decision logic 10. Via the application rate decision logic interface 140, the application rate decision logic 10 is provided to the treatment device 200, in particular the application rate decision logic interface 240 of the treatment device 200. For example, the application rate decision logic 10 in form of a configuration file is uploaded to a memory of the treatment device 200.

When the application rate decision logic 10 is received by the treatment device 200, in particular the treatment control unit 210, the treatment of plantation in the plantation field 300 can begin.

The treatment device 200 moves around the plantation field 300 and detects and recognizes objects 30, in particular crop plants, weeds, pathogens and/or insects on the plantation field 300.

Therefore, the image capture device 200 constantly takes images 20 of the plantation field 300. The images 20 are provided to the image recognition unit 230, which runs an image analysis on the image 20 and detects and/or recognizes objects 30 on the image 20. The objects 30 to detect are preferably crops, weeds, pathogens and/or insects. Recognizing objects includes recognizing a plantation, preferably a type of plantation and/or a plantation size, an insect, preferably a type of insect and/or an insect size, and/or a pathogen, preferably a type of pathogen and/or a pathogen size. For example, it is recognized the difference between for example *Amaranthus retroflexus* and *Digitaria sanguinalis*, or between a bee and a locust. The objects 30 are provided to the treatment control unit 210.

If the image recognition analysis detects an object 30, but is not able to recognize the object 30 and/or its growth stage, the image recognition unit 230 is provided with geometric object profiles, relating to expected geometric appearances of different plantation. The image recognition unit 230 may not be able to recognize the object 30 and/or its growth stage because of many different factors like reflections, unexpected weather conditions and/or unexpected growth stages of the plantation.

The geometric object profiles model the geometry of objects on their species and/or their growth stage. Based on the taken image 20 and the geometric object profiles, the image recognition unit 230 may be able to recognize objects 30 and/or their growth stage that could not have been recognized without the geometric object profiles.

The treatment control unit 210 was provided with the application rate decision logic 10 in form of the configuration file. The application rate decision logic 10 can be illustrated as a decision tree, wherein based on input data, over different layers of decisions a treatment of a plantation is decided and the application rate of the treatment product is decided. For example, in a first step, it is checked, if the biomass of the detected weed exceeds a predetermined threshold set up by the application rate decision logic 10. The biomass of the weed generally relates to the degree of coverage of the weed in the taken image 20. For example, if the biomass of the weed is below 4%, it is decided that the weed is not treated at all. If the biomass of the weed is above 4%, further decisions are made. For example, in a second step, if the biomass of the weed is above 4%, dependent on the moisture of the soil it is decided, if the weed is treated. If the moisture of the soil exceeds a predetermined threshold, it is still decided to treat the weed and otherwise it is decided not to treat the weed. This is, because the herbicides used to treat the weed are more efficient, when the weed is in a growth phase, which is triggered by a high soil moisture. The application rate decision logic 10 already includes information about the expected soil moisture. Since it has been raining the past days, the expected soil moisture is above the predetermined threshold and it will be decided to treat the weed. However, the treatment control unit 210 also is provided by online field data Don, in this case from a soil moisture sensor, providing the treatment control unit 210 with additional data. The decision tree of the configuration file will therefore be decided based on the online field data Don. In an exemplary embodiment, the online field data Don comprises the information that the soil moisture is below the predetermined threshold. Thus, it is decided not to treat the weed.

The treatment control unit 210 generates a treatment control signal S based on the application rate decision logic 10, the recognized objects and/or the online field data Don. The treatment control signal S therefore contains information if the recognized object 20 should be treated or not. The treatment control unit 210 then provides the treatment control signal S to the treatment arrangement 270, which treats the plantation based on the control signal S. The treatment arrangement 270 comprises in particular a chemical spot spray gun with different nozzles, which enables it to spray an herbicide, plant growth regulator, insecticide and/or fungicide with high precision.

Thus, a application rate decision logic 10 is provided dependent on offline field data Doff relating to an expected field condition. Based on the application rate decision logic 10 a treatment device 200 can decide, which plantation should be treated only based on the recognized objects in the field. Thus, the efficiency of the treatment and/or the efficacy of the treatment product can be improved. In order to further improve the efficiency of the treatment and/or the efficacy of the treatment product online field data Don can be used to include current measurable conditions of the plantation field.

The provided treatment arrangement 400 additionally is capable of learning. The machine learning unit 110 determines the application rate decision logic 10 dependent on a given heuristic. After the plantation treatment based on the provided application rate decision logic 10, it is possible to validate the efficiency of the treatment and the efficacy of the treatment product. For example, the farmer can provide the field manager system 100 with field data of a part of the plantation field that has been treated before based on the application rate decision logic 10. This information is referred to as validation data V. The validation data V is provided to the field manager system 100 via the validation data interface 160, providing the validation data V to the machine learning unit 110. The machine learning unit 110 then adjusts the application rate decision logic 10 or the heuristic, which is used to determine the application rate decision logic 10 according to the validation data V. For example, the validation data V indicates that the weed that has been treated based on the application rate decision logic 10 is not killed, the adjusted application rate decision logic 10 lowers the threshold to treat the plantation in one of the branches of the underlying decision tree.

As an alternative to the application rate decision logic 10 in form of a configuration file provided by an external field manager system 100 to a treatment device 200, the functionality of the field manager system 100 can also be embedded into the treatment device 200. For example, a treatment device with relatively high computational power is capable to integrate the field manager system 100 within the treatment device 200. Alternatively, the whole described functionality of the field manager system 100 and the functionality up to the determination of the control signal S by the treatment device 200 can be calculated externally of the treatment device 200, preferably in a cloud service. The treatment device 200 thus is only a "dumb" device treating the plantation dependent on a provided control signal S.

Figure 2:
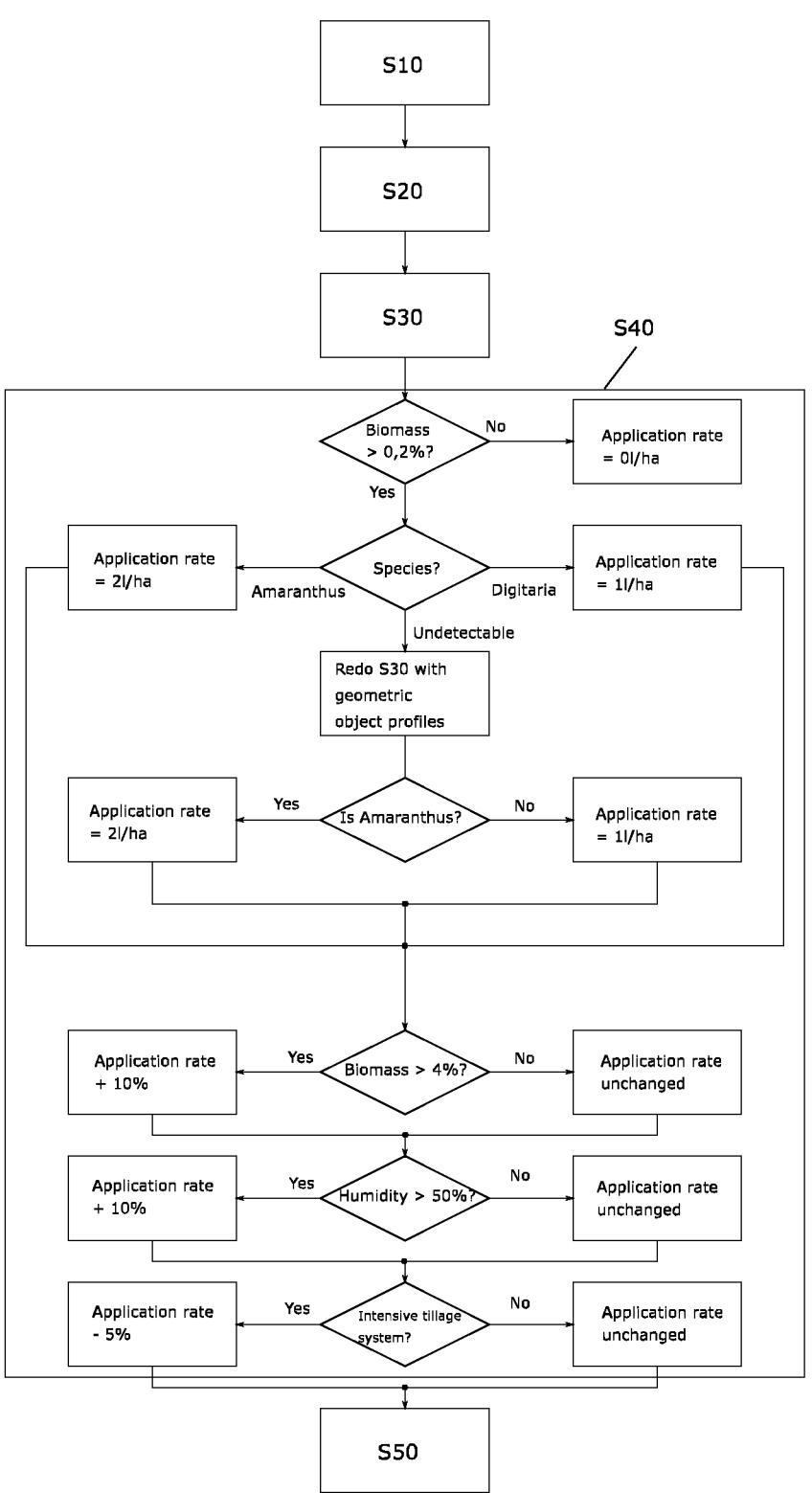
FIG. 2 shows a flow diagram of a plantation treatment method.

FIG. 2 shows a flow diagram of an exemplary embodiment of the plantation treatment method, displaying in particular an implementation of the determination of the application rate.

The plantation to be treated is weed of a plantation field 300. The weed is to be treated with a treatment product like a herbicide. The crop plantation to be cultivated in this example is soy.

The country of cultivation in this example is Brazil. The weed spectrum known in the machine learning unit 110 for the application rate decision logic 20 are *Digitaria sanguinalis* (sourgrass) and *Amaranthus retroflexus* (pig weed).

Based on rainfall events, the maximum growth stage of the weeds is modelled for both species and geometric object profiles are derived to differentiate them. For example, *Digitaria sanguinalis* is expected to be much smaller than *Amaranthus retroflexus* at the time of the treatment. Based on these assumptions application rates are calculated to treat *Digitaria sanguinalis* with 1 l/ha of the herbicide and to treat *Amaranthus retroflexus* with 2 l/ha of the herbicide.

The user is provided with a configuration file for the treatment device 200 and a tank recipe corresponding to the expected weeds.

On the plantation field 300, the user validates the presence of *Digitaria sanguinalis* and *Amaranthus retroflexus* with an image recognition app, for example xarvio scouting.

The user sets up the treatment device 200 with the configuration file and fills the treatment device 200 according to the tank recipe, in particular with a combination of water and the herbicide. The treatment device 200 comprises a treatment arrangement 270 with several independent nozzles. The configuration file will tell the treatment device 200 how to control each nozzle of the treatment device 200 based on the treatment control signal S and in particular a GPS-position and online data from sensors of the treatment device 200.

When treating the weeds, the following steps are executed.

In step S10, an application rate decision logic 10 is determined based on offline field data Doff relating to expected conditions on the plantation field 300. In step S20, an image 20 of a plantation of a plantation field 300 is taken. In step S30, objects 30 are recognized on the taken image 20.

In step S40, the application rate is determined based on the application rate decision logic 10 and the recognized objects 30.

In this case, according to the application rate decision logic 10, it is checked, if the biomass of the recognized object 30 is greater than 0.2%. The percent value relates to the percent of the taken image 20 covered by the recognized object 30. If the biomass of the recognized object 30 is lower than 0.2% the application rate of the herbicide is set to 0 l/ha, since the recognized object 30 is too small to be efficiently treated. If the biomass of the recognized object 30 is bigger than 0.2%, it is checked for the species of the recognized object 30. The percentage of the biomass of the recognized object 30 directly relates to the species and/or the growth stage of the object 30.

If the species of the weed, and therefore the recognized object 30 is *Digitaria sanguinalis*, the application rate of the herbicide is set to 1 l/ha. If the species of the weed is *Amaranthus retroflexus*, the application rate of the herbicide is set to 2 l/ha. If the species of the weed cannot be determined and therefore is undetectable, geometric object profiles are provided to the image recognition unit 230, in particular by the machine learning unit 110, and step S30, recognizing objects 30 on the taken image 20, is redone.

Afterwards, the species of the weed is likely to be recognized and the application rate is set according to the respective species. Alternatively, it is checked if the species of the weed is most likely *Amaranthus retroflexus* and the application rate is therefore set to 2 l/ha of herbicide. If the species of weed is not likely *Amaranthus retroflexus*, the application rate is set to 1 l/ha of herbicide.

According to the application rate decision logic 10, it is now checked, if the biomass of the recognized weed is greater than 4%. If the biomass of the recognized weed is greater than 4%, the application rate of the herbicide is increased by 10%. Otherwise, the application rate of the herbicide is unchanged.

According to the application rate decision logic 10, it is now checked, if the humidity of the environment of the plantation field 300 is greater than 50%. If the humidity if greater than 50%, the application rate of the herbicide is increased by 10%. Otherwise, the application rate of the herbicide is unchanged.

According to the application rate decision logic 10, it is now checked, if an intensive tillage system is present on the plantation field 300. In this case, the application rate of the herbicide is decreased by 5%. Otherwise, the application rate of the herbicide is unchanged.

Furthermore, in step S50, a control signal S for controlling a treatment arrangement 50 of a treatment device 200 is determined based on the determined application rate.

Figure 3:
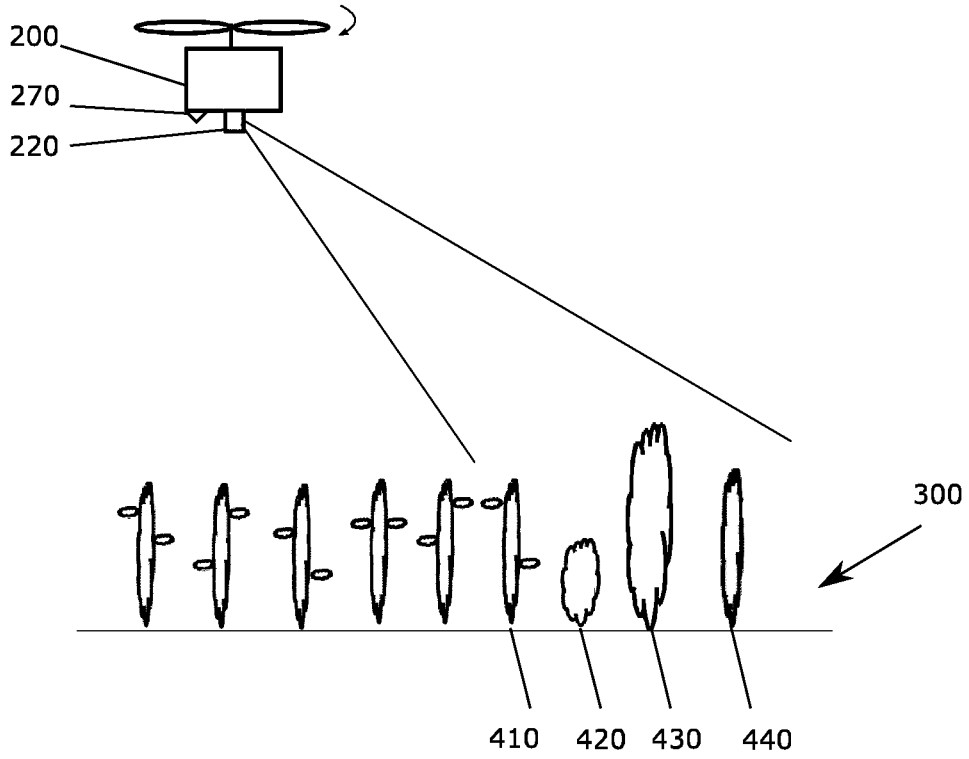
FIG. 3 shows a schematic view of a treatment device on a plantation field.

FIG. 3 shows a treatment device 200 in form of an unmanned aerial vehicle (UAV) flying over a plantation field 300 containing a crop 410. Between the crop 410 there are also a number of weeds 420, The weed 420 is particularly virulent, produces numerous seeds and can significantly affect the crop yield. This weed 420 should not be tolerated in the plantation field 300 containing this crop 410.

The UAV 200 has an image capture device 220 comprising one or a plurality of cameras, and as it flies over the plantation field 300 imagery is acquired. The UAV 200 also has a GPS and inertial navigation system, which enables both the position of the UAV 200 to be determined and the orientation of the camera 220 also to be determined. From this information, the footprint of an image on the ground can be determined, such that particular parts in that image, such as the example of the type of crop, weed, insect and/or pathogen can be located with respect to absolute geospatial coordinates. The image data acquired by the image capture device 220 is transferred to an image recognition unit 230.

The image acquired by the image capture device 220 is at a resolution that enables one type of crop to be differentiated from another type of crop, and at a resolution that enables one type of weed to be differentiated from another type of weed, and at a resolution that enables not only insects to be detected but enables one type of insect to be differentiated from another type of insect, and at a resolution that enables one type of pathogen to be differentiated from another type of pathogen.

The image recognition unit 230 may be external from the UAV 200, but the UAV 200 itself may have the necessary processing power to detect and identify crops, weeds, insects and/or pathogens. The image recognition unit 120 processes the images, using a machine learning algorithm for example based on an artificial neural network that has been trained on numerous image examples of different types of crops, weeds, insects and/pathogens, to determine which object is present and also to determine the type of object.

The UAV also has a treatment arrangement 270, in particular a chemical spot spray gun with different nozzles, which enables it to spray an herbicide, plant growth regulator, insecticide and/or fungicide with high precision.

Figure 4:
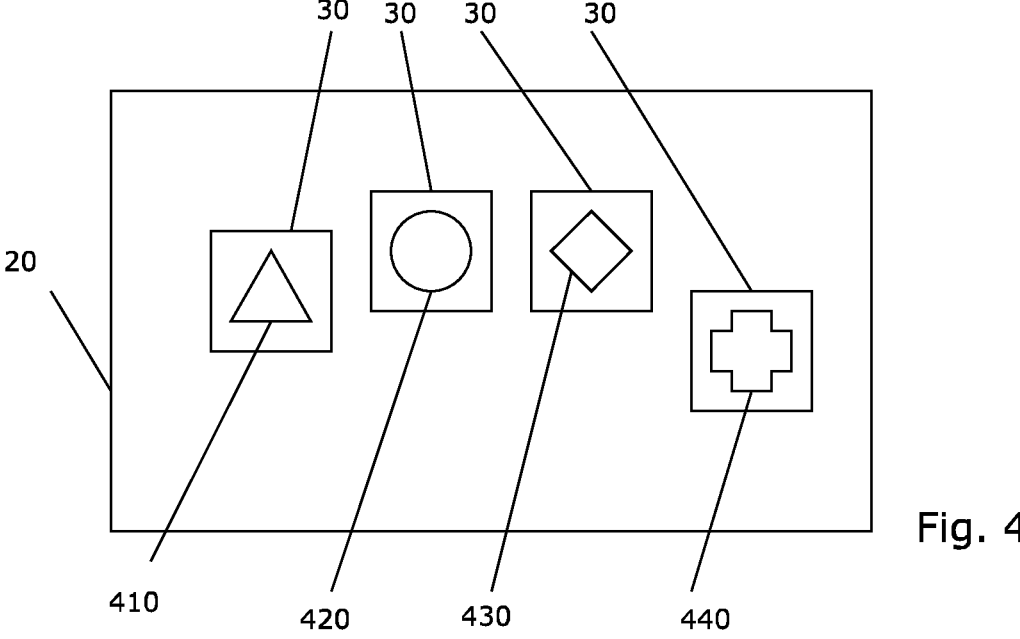
FIG. 4 shows a schematic view of an image with detected objects.

As shown in FIG. 4, the image capture device 220 takes in image 20 of the field 300. The image recognition analysis detects four objects 30 and identifies a crop 410 (triangle), a first unwanted weed 420, *Amaranthus retroflexus*, (circle) and a second unwanted weed 430, *Digitaria sanguinalis*, (rhombus). However, in addition to that an unidentified weed 440 (cross) is detected. Therefore, the image recognition unit 230 uses geometric object profiles provided by the machine learning unit 110 in order to recognize the weed.

Therefore, the efficiency of the image capture device 220 can be improved.

REFERENCE SIGNS

10 application rate decision logic
20 image
30 objects on image
100 field manager system
110 machine learning unit
140 decision logic interface
150 offline field data interface
160 validation data interface
200 treatment device (UAV)
210 treatment control unit
220 image capture device
230 image recognition unit
240 decision logic interface
250 online field data interface
270 treatment arrangement
300 plantation field
400 treatment system
410 crop
420 weed (*Amaranthus retroflexus*)
430 weed (*Digitaria sanguinalis*)
440 unidentified weed
S treatment control signal
Don online field data
Doff offline field data
V validation data
S10 determining application rate decision logic
S20 taking image
S30 recognizing objects on image
S40 determining application rate
S50 determining control signal

The invention claimed is:

1. A method for plantation treatment of a plantation field, the method comprising:

determining an application rate decision logic in the form of a configuration file comprising one or more layers, including (i) a rule for an on/off treatment decision; and (ii) a rule for determining an application rate of a treatment product based on parameters derived from object recognition, the application rate decision logic based on a combination of offline field data (Doff) relating to expected conditions on the plantation field and online field data (Don) collected during the plantation treatment of the plantation field;

capturing at least one image, each at least one image corresponding to specific locations of a plantation of a plantation field;

recognizing the objects in the captured at least one image based on historical and offline and online field data to improve object recognition accuracy and treatment efficacy;

determining the application rate for each of the specific locations based on the determined application rate decision logic and the recognized objects; and determining a control signal(S) for controlling a treatment arrangement of a treatment device based on the determined application rate, wherein the treatment arrangement is controlled during the plantation treatment based on each instance of capturing at least one image and recognizing the objects in the corresponding image, and the application rate decision logic is adjustable based on validation data (V) indicative of the treatment efficacy.

2. The method of claim 1, wherein:

capturing an image of the plantation of the plantation field; recognizing the objects on the captured image, determining the application rate and determining the control signal(S) for controlling the treatment arrangement are carried out as a real time process, such that the treatment device is instantaneously controllable based on captured images of the plantation field as the treatment device traverses through the field at the time of treatment in a specific location of the plantation field.

3. The method of claim 1, wherein:

the application rate decision logic provides a logic to determine the application rate for treating the plantation depending on an expected efficacy loss of a crop to be cultivated in the plantation field.

4. The method of claim 1, wherein:

the application rate decision logic includes variable application rates depending on one or more parameter(s) derived from the image and/or object recognition.

5. The method of claim 1, wherein:

recognizing the objects is based on the captured image and/or geometric object profiles, modeling the geometry of the objects based on their species and/or their growth stage.

6. The method of claim 1, wherein:

determining the application rate based on the recognized objects includes determining object species, object growth stages and/or object density.

7. The method of claim 1, further comprising:

receiving the online field data (Don) by the treatment device relating to current conditions on the plantation field; and determining the control signal(S) dependent on the determined application rate decision logic and the determined recognized objects and/or the determined online field data (Don).

8. The method of claim 7, wherein:

the online field data (Don) relates to current weather condition data, current plantation growth data and/or current soil data.

9. The method of claim 1, further comprising:

providing the validation data (V) dependent on a performance review of the treatment of the plantation; and adjusting the application rate decision logic dependent on the validation data (V).

10. The method of claim 9, further comprising:

adjusting the geometric object profiles based on the validation data (V).

11. The method of claim 1, further comprising:

adjusting the application rate decision logic using a machine learning algorithm.

12. A field manager system for a treatment device for plantation treatment of a plantation field, the field manager system comprising:

one or more processors configured to:

capturing at least one image, each at least one image corresponding to specific locations of a plantation of a plantation field;

receive offline field data (Doff) relating to expected conditions on the plantation field;

determine application rate decision logic of the treatment device in the form of a configuration file comprising one or more layers, including (i) a rule for an on/off treatment decision; and (ii) a rule for determining an application rate of a treatment product based on parameters derived from object recognition based on each instance of capturing at least one image, the application rate decision logic dependent on the offline field data (Doff) and online field data (Don) collected during the plantation treatment of the plantation field; and provide the application rate decision logic to the treatment device.

13. The field manager system of claim 12 wherein the one or more processors are further configured to:

receive validation data (V), wherein the one or more processors adjust the application rate decision logic dependent on the validation data (V).

14. A treatment system comprising the field manager system according to claim 12.

15. A treatment device for plantation treatment of a plant, the treatment device comprising: one or more processors configured to:

receive the application rate decision logic from the field manager system according to claim 12;

treat the plantation dependent on the received application rate decision logic;

recognize the objects on the captured image based on historical and offline and online field data to improve object recognition accuracy and treatment efficacy; and determine a control signal(S) for controlling a treatment arrangement dependent on the received application rate decision logic and the recognized objects, treatment arrangement is controlled during the plantation treatment based on each of instance of capturing at least one image and recognizing the objects in the corresponding image, and the application rate decision logic is adjustable based on validation data (V) indicative of the treatment efficacy;

wherein the treatment device is connectable to the field manager system; and wherein the treatment device activates treating the plantation based on the determined control signal(S).

16. The treatment device of claim 15, wherein the one or more processors are further configured to:

receive online field data (Don) relating to current conditions on the plantation field, wherein the treatment device determines the control signal(S) for controlling treating the plantation dependent on the received application rate decision logic and the recognized objects and/or the online field data (Don).

17. The treatment device of claim 15, wherein one or a plurality of cameras capture the image of the plantation, in particular on a boom of the treatment device, wherein the treatment device recognizes the objects using red-green-blue RGB data and/or near infrared NIR data.

18. The treatment device of claim 15, wherein the treatment device is a smart sprayer, and wherein treating the plantation includes the treatment arrangement, wherein the treatment arrangement comprises a nozzle arrangement.

19. The treatment device of claim 15, wherein the treatment device comprises a plurality of cameras and the treatment arrangement comprises a plurality of nozzle arrangements, each associated to one of the plurality of cameras, such that images captured by the cameras are associated with the area to be treated by the respective nozzle arrangement.

\* \* \* \* \*